(12) United States Patent
Mianzo et al.

(10) Patent No.: US 6,347,680 B1
(45) Date of Patent: Feb. 19, 2002

(54) ENGINE OUTPUT CONTROLLER

(75) Inventors: Lawrence A. Mianzo, Plymouth; Stephen De La Salle, Saline, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/657,877

(22) Filed: Sep. 8, 2000

(51) Int. Cl.$^7$ ............................................... B60K 13/02
(52) U.S. Cl. ...................... 180/197; 180/170; 701/93; 123/350
(58) Field of Search .................. 180/197, 170, 180/175–179; 701/54, 53, 55, 56, 58, 60, 64, 66; 123/345, 346, 349, 394, 403, 350

(56) References Cited

U.S. PATENT DOCUMENTS

| | | | |
|---|---|---|---|
| 4,714,864 A | * 12/1987 | Yogo et al. | ................... 180/197 |
| 5,078,109 A | * 1/1992 | Yoshida et al. | .............. 123/350 |
| 5,088,043 A | * 2/1992 | Akishino et al. | ...... 364/426.04 |
| 5,197,008 A | * 3/1993 | Itoh et al. | .............. 364/426.01 |
| 5,243,526 A | * 9/1993 | Ito et al. | ................. 364/426.02 |
| 5,400,865 A | * 3/1995 | Togai et al. | ................. 180/197 |
| 5,541,843 A | * 7/1996 | Yamaguchi et al. | ... 364/426.02 |
| 5,625,558 A | * 4/1997 | Togai et al. | .......... 364/426.041 |
| 6,304,809 B1 | * 10/2001 | Cullen et al. | .................. 701/93 |

* cited by examiner

*Primary Examiner*—Anne Marie Boehler
*Assistant Examiner*—Tony Winner
(74) *Attorney, Agent, or Firm*—John E. Kajander

(57) ABSTRACT

An engine output control method for a vehicle having a drive by wire engine system responsive to a desired engine speed signal. The method comprises the steps of generating a driver demanded engine speed value corresponding to an operator input and generating a speed control system engine speed value corresponding to a predetermined speed value to permit vehicle operation at a constant speed by a speed control system. The method arbitrates between the driver demanded engine speed value and the speed control system engine speed value to derive a first desired engine speed value. This value is limited by a vehicle speed limit value, engine speed limit value, and transmission speed limit value to generate a second desired engine speed value. The engine is then controlled as a function of the second desired engine speed value and an actual engine speed value. In another aspect of the invention, a traction control value and transmission limiting value are generated in the torque domain and arbitrated against the speed domain-based second desired engine speed value to control the engine output. In another embodiment, the driver demand, speed control and traction control are arbitrated in the vehicle or engine acceleration domain and constrained by engine, transmission and vehicle speed limits.

18 Claims, 5 Drawing Sheets

ENGINE OUTPUT CONTROLLER

BACKGROUND OF THE INVENTION

The invention relates generally to control systems for internal combustion engines, and more particularly, concerns a powertrain controller for drive by wire vehicles.

For "drive by wire"-equipped vehicles such as an electronic throttle control-equipped vehicle a variable valve timing-equipped vehicle, it is necessary to interpret driver demand and convert it to an appropriate engine control command to deliver the desired engine/vehicle response. For example, in U.S. Pat. No. 5,400,865, the driver demand is converted to common control variable selected from throttle angle, airflow or torque to control the engine output. The torque-based scheme arbitrates between multiple requests for powertrain output torque. These output torque requests originate from the driver demand, the speed control system, or the traction control system. Only one of these output power requests, however, is chosen by the control system to regulate the engine output torque. The maximum output power request is arbitrated between the speed control system and the driver demand. If the vehicle is equipped with traction control, the output power request is also limited by the output torque request of the traction control system.

Interpreting driver demand and generating an appropriate engine command, however, is complicated by the existence of other sub-systems including vehicle, engine or transmission constraints such as vehicle speed limits, engine speed limits and transmission speed or torque limits. Accordingly, there is a need for an arbitration scheme which selects the most appropriate engine control parameter from the various requesters. Arbitration schemes that rely upon a common control variable such as torque or airflow may not be suitable for some vehicle and engine systems.

SUMMARY OF THE INVENTION

Accordingly, it is an object of the present invention to provide an improved engine output controller.

According to the present invention, the foregoing and other objects and advantages are attained by an engine output control method for a vehicle having a drive by wire engine system responsive to a desired engine speed signal. The method comprises the steps of generating a driver demanded engine speed value corresponding to an operator input and generating a speed control system engine speed value corresponding to a predetermined speed value to permit vehicle operation at a constant speed by a speed control system. The method arbitrates between the driver demanded engine speed value and the speed control system engine speed value to derive a first desired engine speed value. This value is limited by a vehicle speed limit value, engine speed limit value, and transmission speed limit value to generate a second desired engine speed value. The engine is then controlled as a function of the second desired engine speed value and an actual engine speed value. In another aspect of the invention, a traction control value and transmission limiting value are generated in the torque domain and arbitrated against the speed domain-based second desired engine speed value to control the engine output.

In another embodiment of the present invention, values are generated in the acceleration domain to control the engine output. Specifically, values are generated for a driver demanded vehicle acceleration value corresponding to an accelerator pedal position; a speed control system vehicle acceleration value corresponding to a predetermined speed value to permit vehicle operation at a constant speed by a speed control system; a vehicle speed limit acceleration value corresponding to a maximum vehicle acceleration value to achieve a predetermined vehicle speed limit; and a traction control vehicle acceleration value corresponding to a maximum vehicle acceleration value to prevent wheel slip. These values are then arbitrated to derive a first desired vehicle acceleration value. The first desired vehicle acceleration value is limited by an engine speed limit value and transmission speed limit value to generate a second desired vehicle acceleration value. The resulting value can be used to control the engine output directly or converted to a desired engine acceleration value to control the engine output.

Other objects and advantages of the invention will become apparent upon reading the following detailed description and appended claims and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of example to the invention. In the drawings.

DETAILED DESCRIPTION OF THE PREFERRED EMBODIMENT

Figure 1:
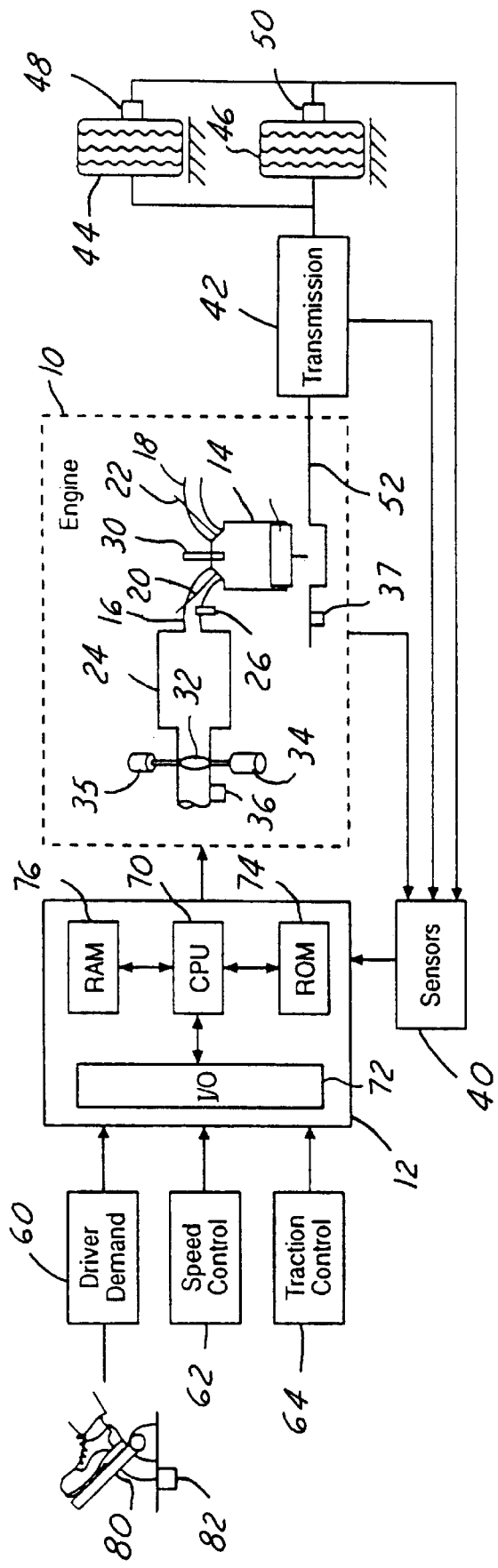
FIG. 1 is a schematic diagram of an internal combustion engine and associated control system according to one embodiment of the present invention.

Turning first to FIG. 1, there is shown a schematic diagram of an internal combustion engine 10 and associated engine controller 12 in accordance with one embodiment of the present invention. The engine 10 includes a plurality of combustion chambers 14, one of which is shown. Each combustion chamber 14 has an associated intake 16 and exhaust 18 operated by a respective valves 20, 22. Valves 20, 22 may be electronically controlled to allow variable valve timing. Combustion occurs as a result of the intake of air and fuel from the intake manifold 24 and fuel injector 26 respectively, compression by the piston 28 and ignition by the spark plug 30. Combustion gases travel through the exhaust manifold 18 to the downstream catalytic converter (not shown) and are emitted out of the tailpipe. A portion of the exhaust gases may also be recirculated back through the intake manifold 24 to the engine cylinders 14 by way of an EGR valve (not shown).

The engine 10 is a drive by wire-controlled engine including an electronic throttle, thus, the airflow through the intake manifold 24 is controlled by a throttle comprising a throttle plate 32 and throttle actuator 34. A throttle position sensor 35 measures the actual throttle position. A mass airflow (MAF) sensor 36 measures the amount of air flowing into the engine 10. An engine speed sensor 37 provides a value indicative of the rotational speed of the engine 10. Further, additional sensors are represented by block 40 which provide feedback to the engine controller 12 relating to the status of the engine 10 transmission 42 and wheels 44, 46. Controller 12 receives various signals such as a first measurement of vehicle speed of wheel 44 from sensor 48, a second measurement of vehicle speed of wheel 46 from sensor 50, measurement of vehicle acceleration from an accelerometer (not shown) as well as various other signals from sensors such as engine coolant temperature (ECT), barometric pressure (BP), air charge temperature (ACT), and manifold pressure (MAP).

Although the engine shown in FIG. 1 is equipped with an electronic throttle system, the present engine control scheme is equally applicable to other drive by wire engine systems including engines having electronically controlled variable valve timing (with or without a throttle system) and electronically controlled diesel engines.

Transmission 42 is coupled to the crankshaft 52 of engine 10 and a first set of drive wheels 46. In addition, to provide all wheel drive, transmission 42 can also be coupled to a second set of drive wheels 44. Transmission 42 can be a combined gear set and torque converter, a manual transmission, automatic transmission, a continuously variable transmission, or any other power transfer unit known to those skilled in the art and suggested by this disclosure.

Continuing with FIG. 1, in addition to receiving various signals from sensors, controller 12 also receives inputs from the driver demand system 60, speed control system 62 and the traction control system 64. Controller 12 is a conventional microcomputer including a microprocessor unit 70, input/output ports 72, electronically programmable memory 74, random access memory 76, and a conventional data bus.

The driver demand system 60 interprets the operator's requested engine output by monitoring the position of the accelerator 80 by pedal position sensor 82. The pedal position value as measured by the sensor 82 is communicated to the controller 12 wherein a desired engine output is determined by known methods. The driver demand could also be determined from operator inputs other than the accelerator pedal such as push button. The speed control system 62 communicates a desired speed set by the vehicle operator to the controller 12 to maintain the vehicle speed at that desired by the operator. Traction control system 64 monitors wheel slip and/or vehicle acceleration to limit the engine output power accordingly.

Figure 2:
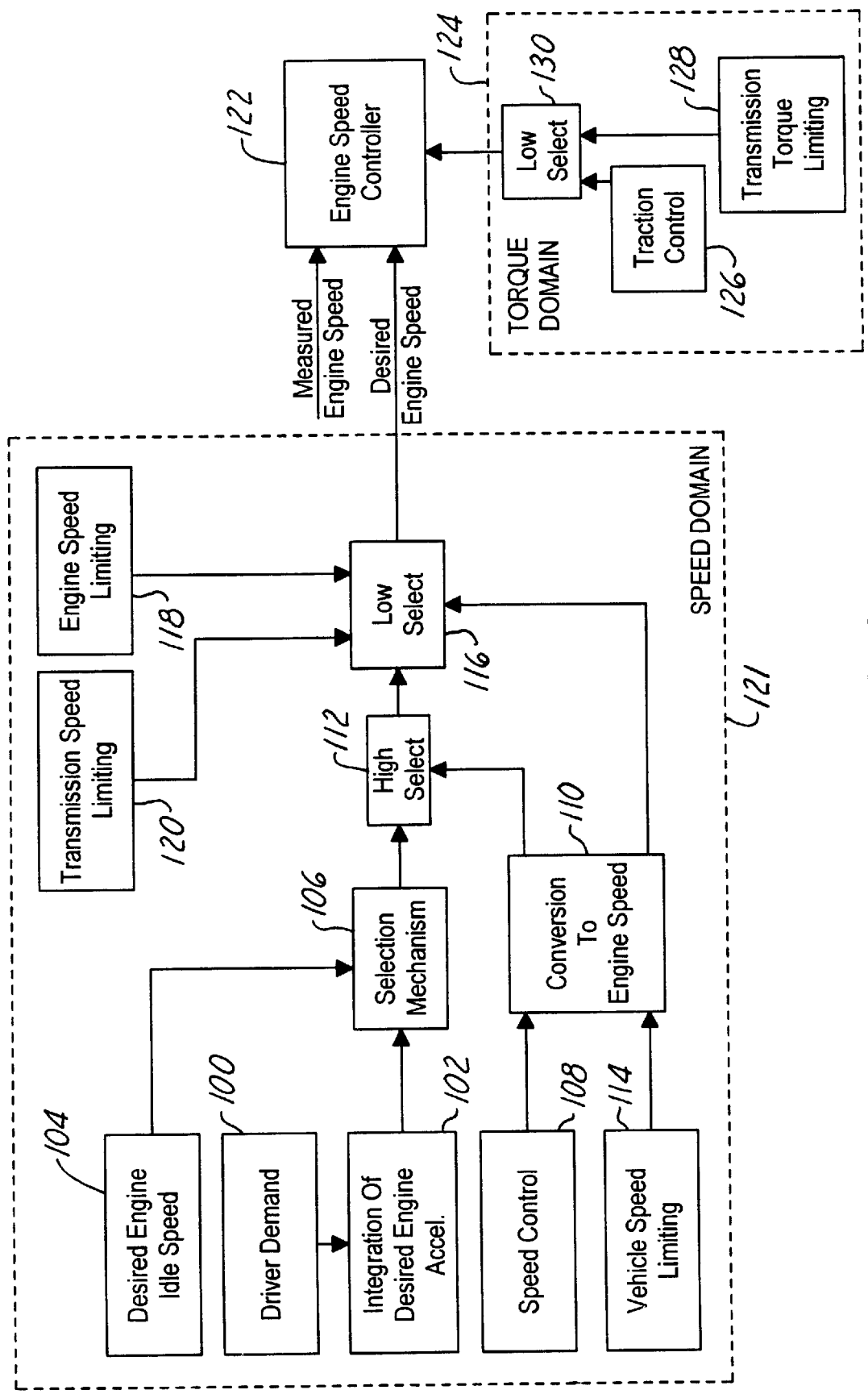
FIG. 2 is a block diagram of one embodiment of the controller of FIG. 1.

FIG. 2 shows a block diagram of one embodiment of the controller 12 of FIG. 1. FIG. 2 shows a manual transmission application wherein arbitration takes place between at least two different control variables. Specifically, driver demand and speed control are arbitrated in the engine speed domain, and the resulting desired engine speed is then arbitrated with traction control requirements in either the torque, acceleration, or speed domain.

Referring to FIG. 2, in block 100, the driver demanded engine acceleration is determined by known methods such as the pedal position input. The conversion from driver demand to engine acceleration will typically be a function of engine speed and inferred or measured driveline ratio in addition to the pedal position. In block 102, the desired engine acceleration is integrated with respect to time to generate a desired engine speed value. A desired engine idle speed is also determined in block 104 which represents a minimum engine speed for the engine operating conditions. By way of the selection mechanism 106, a new target engine speed is determined based on the idle speed request from block 104 and the driver demand from block 100. Typically, selection mechanism 106 will select the maximum engine speed as between the desired idle speed and the driver demand. Preferably, the selection mechanism is formed such that no "dead pedal" feel exists and any driver demand from an idle condition results in an increase in scheduled engine speed and resulting change in actual engine speed.

If active, a desired vehicle speed from the speed control system 108 will also be generated. A desired vehicle speed is translated into a desired engine speed in block 110 by way of the measured or inferred transmission gear ratio. The resulting engine speed is then arbitrated with the engine speed in the selection arbitration block 112 with the engine speed resulting from the selection mechanism 106. Preferably, the greater of the engine speed requests from the driver demand and speed control system will be selected in block 112.

The resulting engine speed value from arbitration block 112 is then constrained by vehicle engine and transmission speed limits. Vehicle speed limiting is determined in block 114 and is again converted to an engine speed limit associated therewith in block 110. This value is then passed along to the arbitration block 116. Similarly, an engine speed limit value from block 118 is also used to constrain the desired engine speed value resulting from the driver demand or speed control systems. Optionally, the system may also include integrated transmission speed protection in block 120, in which case, the transmission speed limit is applied as a clip to the engine speed limit request 118.

The desired engine speed as derived from the speed domain 121 is then communicated to the engine speed controller 122. Engine speed controller 122 can be PID controller which receives as an input a measured engine speed and outputs a desired airflow, fueling rate, and spark timing in the case of a gasoline engine to achieve the desired engine speed. The controller 122 also accommodates other system constraints as received from the torque domain 124.

Torque domain restraints on the engine speed include a maximum torque value to prevent wheel slip as determined by the traction control system 126, and any torque-based transmission requirements in control block 128. These torque-based constraints are then clipped in block 130 and communicated to the engine speed controller 122. The engine speed controller 122, in turn, limits the engine output according to the torque-based constraints. Alternatively, the traction control system and transmission limiting can be derived in terms of an engine speed or engine acceleration and the resulting constraint arbitrated against the desired engine speed to control the engine accordingly.

Figure 3:
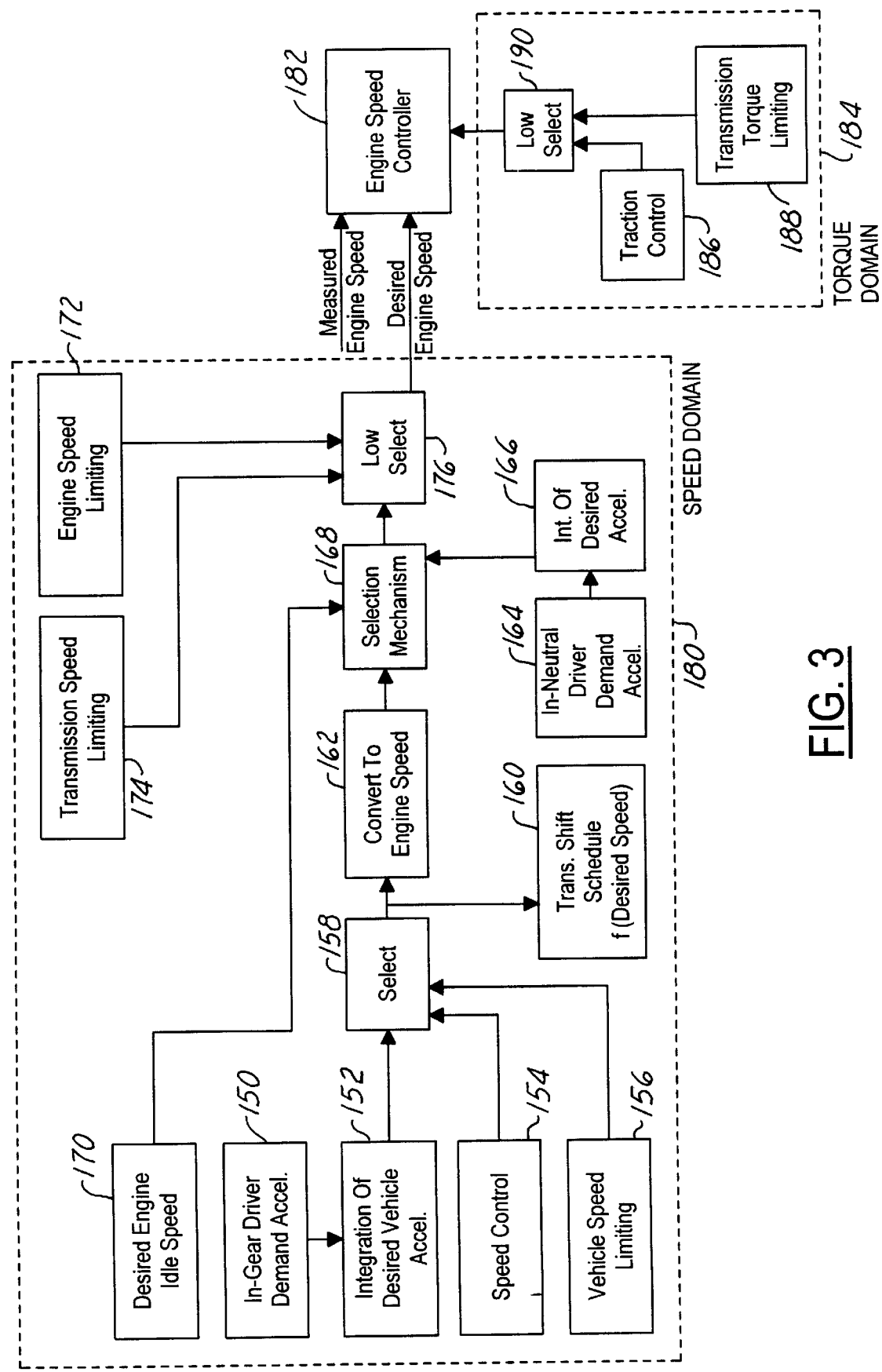
FIG. 3 is a block diagram of another embodiment of the controller of FIG. 1.

FIG. 3 shows a block diagram of another embodiment of the controller 12 of FIG. 1. FIG. 3 shows an automatic transmission application wherein arbitration takes place between at least two different control variables. Specifically, driver demand and speed control are arbitrated in the engine speed domain, and the resulting desired engine speed is then arbitrated with traction control requirements in either the torque, acceleration, or speed domain.

Referring to FIG. 3, in block 150, the driver demanded vehicle acceleration is determined by known methods such as a pedal position input. This is applicable when the transmission is engaged in gear. The conversion from driver demand to vehicle acceleration will typically be a function of vehicle speed and inferred or measured driveline ratio in addition to the accelerator pedal position. In block 152, the desired vehicle acceleration is integrated with respect to time to generate a desired road speed value. If active, a desired vehicle speed from the speed control system 154 will also be generated. Preferably, the system also includes vehicle speed limiting in block 156 which acts as a clip to ensure that the requested vehicle speed does not exceed a maximum allowable value. These values are arbitrated in block 158 and a selection is made at the most appropriate value of desired road speed from among the in-gear driver demand, speed control system, and speed limiting system.

For transmission shift scheduling purposes, the desired road speed or acceleration can be used as a measure of driver demand as shown in block 160.

The desired vehicle speed is then converted in block 162 to an equivalent engine speed based on the measured or inferred transmission ratio. A corresponding in-neutral driver demand engine speed acceleration is determined in block 164 and is translated in block 166 to an equivalent in neutral engine speed demand. The selection mechanism 168 selects a new value of target engine speed based upon the idle engine speed request from block 170, the converted vehicle speed request from block 162, and the in-neutral driver request from block 166. Preferably, the selection mechanism 168 is formed such that no "dead pedal" feel exists in any driver demand from an idle condition results in an increase in scheduled engine speed and resulting change in actual engine speed.

The resulting engine speed value from arbitration block 168 is then constrained by an engine speed limit value from block 172. Optionally, the system may also include integrated transmission speed protection in block 174, in which case, the transmission speed limit value is also applied as a clip to the engine speed limit request 172. Arbitration block 176 acts to constrain the desired engine speed value from the driver demand and speed control systems by the engine speed limit and transmission speed limit values.

The desired engine speed is derived from a speed domain 180 is then communicated to the engine speed controller 182. Engine speed controller 182 can be PID controller which receives as an input in measured engine speed and outputs a desired airflow, fueling rate, and spark timing in the case of a gasoline engine to achieve the desired engine speed. The controller 182 also accommodates other system constraints as received from the torque domain 184.

Torque domain restraints on the engine speed include a maximum torque value to prevent wheel slip as determined by the traction control system 186, and any torque-based transmission requirements in control block 188. These torque-based constraints are then clipped in block 190 and communicated to the engine speed controller 182. The engine speed controller 182, in turn, limits the engine output according to the torque-based constraints. Alternatively, the traction control system and transmission limiting can be derived in terms of an engine speed or engine acceleration, and the resulting constraint arbitrated against the desired engine speed to control the engine accordingly.

Figure 4:
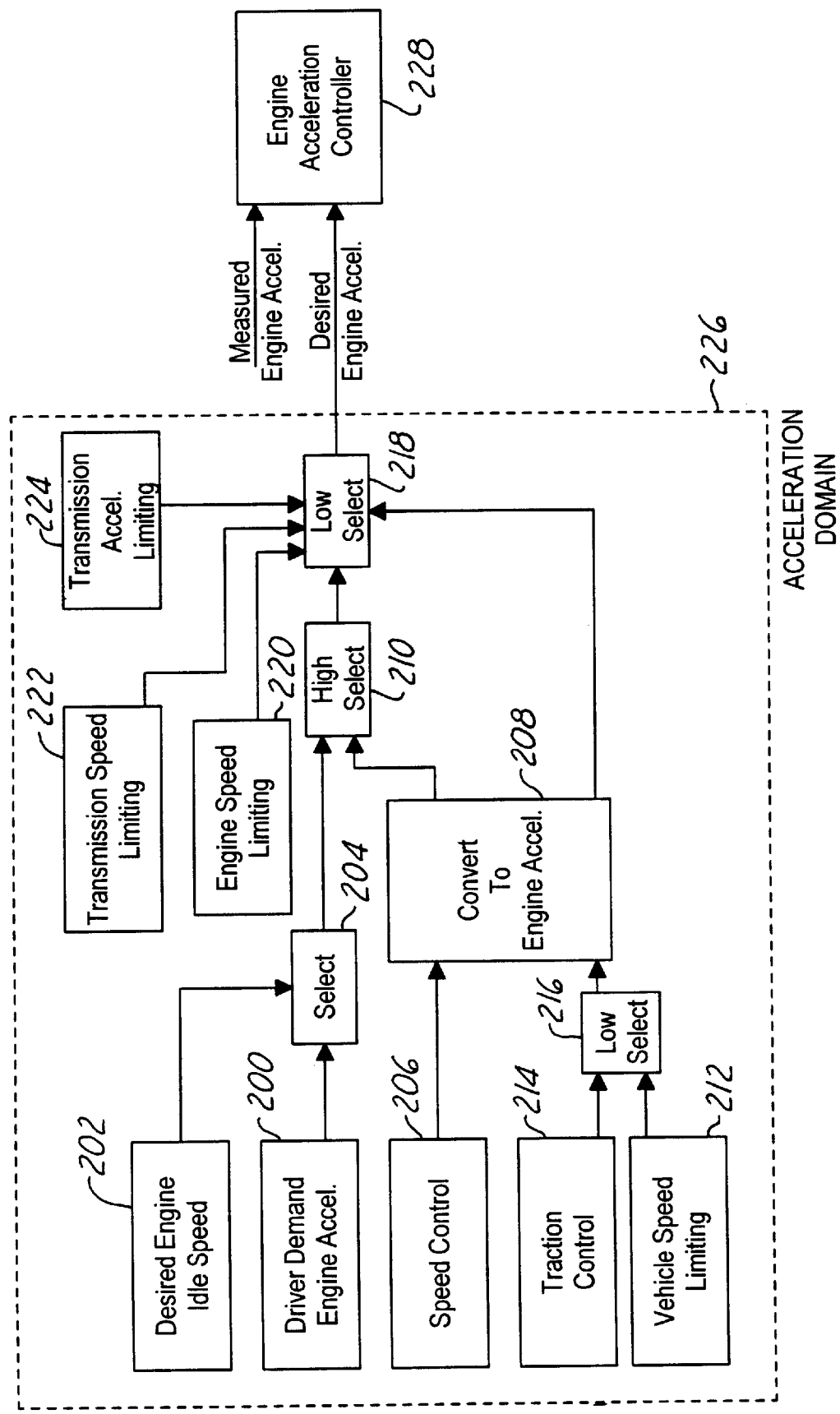
FIG. 4 is a block diagram of another embodiment of the controller of FIG. 1.

FIG. 4 shows a block diagram of another embodiment of the controller 12 of FIG. 1. FIG. 4 shows a manual transmission application wherein arbitration takes place between the driver demand, speed control, and traction control systems in the engine acceleration domain. In block 200, the driver demanded engine speed acceleration is determined by, for example, the pedal position input. The conversion from pedal position input to desired engine speed acceleration will typically be a function of engine speed and inferred or measured driveline ratio in addition to the pedal position input. A desired engine acceleration request to maintain the engine idle at its predetermined value is also determined in block 202. By way of the selection mechanism 204, a new target engine speed acceleration is determined based upon the idle engine speed acceleration request from block 202 and the driver demanded engine speed acceleration request from block 200. Typically, the selection mechanism 204 will select the maximum engine speed acceleration as between the idle speed request and driver demand. Preferably, the selection mechanism 204 is formed such that no "dead pedal" feel exists and any driver demand from an idle condition results in an increase in scheduled engine speed acceleration and resulting change in actual engine speed.

If active, a desired vehicle speed acceleration from the speed control system 206 will also be generated. The desired vehicle speed acceleration is translated to a desired engine speed acceleration in block 208 by way of the measured or inferred transmission gear ratio. The resulting desired engine acceleration is then arbitrated in block 210 with the engine acceleration request from selection block 204.

This system also includes vehicle speed limiting in block 212 and traction control system 214 both of which generate vehicle speed acceleration limits, the lowest one of which is selected in block 216. The resulting value is again converted from a vehicle acceleration value to an engine acceleration value in block 208 and communicated to arbitration block 218.

Preferably, the system also includes engine acceleration speed limiting 220, and integrated transmission speed protection 222 as well as acceleration-based transmission torque truncation 224. All of these values which act to limit the engine acceleration are also communicated to the arbitration block 218, wherein the received values are arbitrated with the driver demand and speed control resulting engine acceleration value to produce a final desired engine acceleration value.

The desired engine acceleration value as derived from the acceleration domain 226 is then communicated to the engine acceleration controller 228. The engine acceleration controller 228 is preferably a PID controller which receives as an input a measured engine acceleration value and outputs a desired airflow, fueling rate, and spark timing in the case of a gasoline engine to achieve the desired acceleration value.

Figure 5:
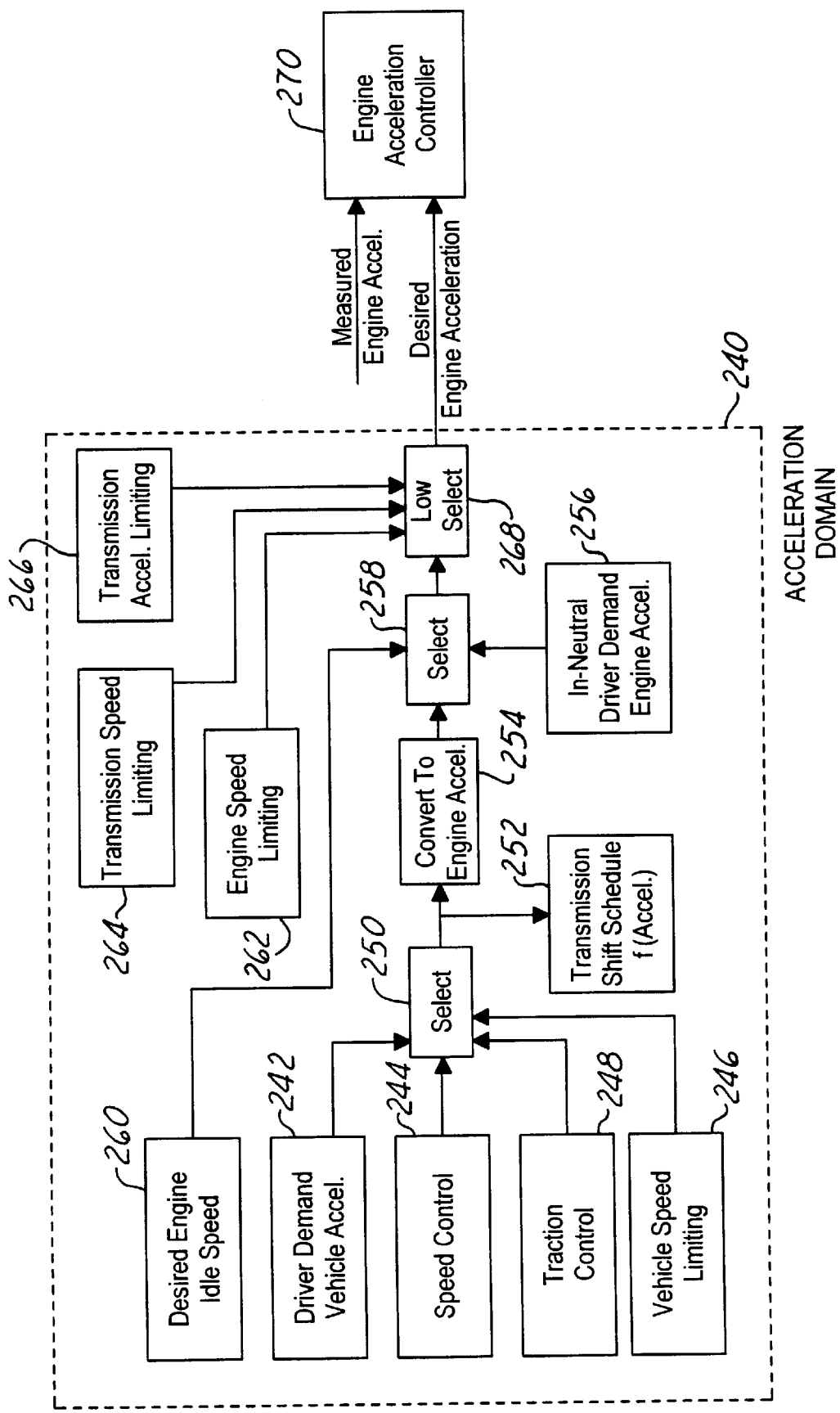
FIG. 5 is a block diagram of another embodiment of the controller of FIG. 1.

FIG. 5 shows a block diagram of another embodiment of the controller 12 of FIG. 1. FIG. 5 shows an automatic transmission application wherein arbitration takes place in the acceleration domain 240. In block 242, the driver demanded vehicle acceleration is determined when the transmission is engaged. The conversion from the driver demand to a desired vehicle acceleration will typically be a function of vehicle speed and the inferred or measured driveline ratio in addition to the accelerator pedal position. If active, a desired vehicle speed acceleration from the speed control system 244 will also be generated. Preferably, this system also includes vehicle speed limiting 246 and traction control system 248 which each generate vehicle acceleration limit values. The resulting vehicle acceleration values are arbitrated in block 250. For transmission shift scheduling purposes, the desired vehicle acceleration from arbitration block 250 can be used as a measure of driver demand in block 252.

The desired vehicle acceleration value from arbitration block 250 is then converted to an equivalent engine acceleration value in block 254 based on the measured or inferred transmission ratio. If the transmission is not in gear, an in-neutral driver demand engine acceleration request is determined in block 256. By way of the selection mechanism 258, a new value of target engine acceleration is determined based upon the idle engine acceleration request 260, the converted vehicle acceleration request 254, and the in-neutral driver demand 256. Preferably, the selection mechanism 258 is formed such that no "dead pedal" feel exists and any driver demand from an idle condition results in an increase in scheduled engine speed acceleration and a resulting change in actual engine speed.

As in the manual transmission application of FIG. 4, the system of FIG. 5 also includes engine speed limiting 262, transmission speed limiting 264, and acceleration-based transmission torque truncation 266. These clips are then applied in arbitration block 268 so as to ensure that the requested engine acceleration does not exceed any maximum allowable values. The resulting desired engine acceleration is communicated to the engine acceleration controller 270. Engine acceleration controller 270 can be PID controller which receives as an input a measured engine acceleration and outputs a desired airflow, fueling rate, and spark timing in the case of a gasoline engine to achieve the desired engine acceleration. The final desired engine acceleration value can also be integrated to be put in the speed domain and a controller 270 can use feedback on the measured engine speed to achieve the desired engine speed.

From the foregoing, it can be seen that there has been brought to the art a new and improved engine central system for a drive by wire vehicle. While the invention has been described with reference to one or more embodiments, it should be understood that it is not limited to these embodiments. On the contrary, the invention covers all alternatives, modifications, and equivalents as may be included with the spirit and scope of the appended claims.

What is claimed is:

1. An engine output control method for a vehicle having a drive by wire engine system responsive to a desired engine speed signal, the method comprising the steps of:
   generating a driver demanded engine speed value corresponding to an operator input;
   generating a speed control system engine speed value corresponding to a predetermined speed value to permit vehicle operation at a constant speed by a speed control system;
   arbitrating between said driver demanded engine speed value and said speed control system engine speed value to derive a first desired engine speed value;
   limiting said first desired engine speed value by a vehicle speed limit value, engine speed limit value, and transmission speed limit value to generate a second desired engine speed value; and
   controlling said engine output as a function of said second desired engine speed value and an actual engine speed value.

2. The method of claim 1 further comprising the steps of:
   generating an engine output torque limit value; and
   limiting said second desired engine speed value as a function of said engine output torque value.

3. The method of claim 2 wherein the step of generating an engine output torque limit value comprises the steps of:
   generating a traction control system torque value corresponding to a maximum engine output torque value to prevent wheel slip;
   generating a transmission torque limit value corresponding to a maximum engine output torque capability of a transmission; and
   setting said engine output torque limit value to the lesser of said traction control system torque value and said transmission torque limit value.

4. The method of claim 1 further comprising the steps of:
   generating a desired engine idle speed value; and
   setting said 1st desired engine speed value to the greater of said desired engine idle speed value and said driver demanded engine speed value.

5. The method of claim 3 wherein the step of generating a driver demanded engine speed value includes the steps of generating a driver demanded engine acceleration value and integrating said driver demanded engine acceleration value.

6. The method of claim 1 further comprising the step of converting said desired vehicle speed limit value to an engine speed domain value representing said vehicle speed limit value.

7. The method of claim 1 wherein the step of generating a speed control system engine speed value includes the step of converting a speed control system vehicle speed value to an engine speed domain value.

8. An engine output control method for a vehicle having a drive by wire engine system responsive to a desired engine speed signal, the method comprising the steps of:
   generating a driver demanded vehicle speed value corresponding to an operator input;
   generating a speed control system value corresponding to a predetermined speed value to permit vehicle operation at a constant speed by a speed control system;
   arbitrating between said driver demanded vehicle speed value, said speed control system value, and a vehicle speed limit value to derive a first desired vehicle speed value;
   converting said first desired vehicle speed value to a first desired engine speed value;
   limiting said first desired engine speed value by an engine speed limit value, and transmission speed limit value to generate a second desired engine speed value; and
   controlling said engine output as a function of said second desired engine speed value and an actual engine speed value.

9. The method of claim 8 further comprising the steps of:
   generating an engine output torque limit value; and
   limiting said second desired engine speed value as a function of said engine output torque value.

10. The method of claim 9 wherein the step of generating an engine output torque limit value comprises the steps of:
    generating a traction control system torque value corresponding to a maximum engine output torque value to prevent wheel slip;
    generating a transmission torque limit value corresponding to a maximum engine output torque capability of a transmission; and
    setting said engine output torque limit value to the lesser of said traction control system torque value and said transmission torque limit value.

11. The method of claim 8 further comprising the steps of:
    generating a desired engine idle speed value;
    generating an in-neutral driver demanded engine speed value and
    arbitrating between said first desired engine speed value, said desired engine idle speed value and said in-neutral driver demanded engine speed value.

12. The method of claim 8 wherein the step of generating a driver demanded vehicle speed value includes the step of integrating a driver demanded vehicle acceleration value.

13. An engine output control method for a vehicle having a drive by wire engine system responsive to a desired engine acceleration signal, the method comprising the steps of:
    generating a driver demanded engine acceleration value corresponding to an operator input;
    generating a speed control system engine acceleration value corresponding to a predetermined speed value to permit vehicle operation at a constant speed by a speed control system;

arbitrating between said driver demanded engine acceleration value and said speed control system engine acceleration value to derive a first desired engine acceleration value;

limiting said first desired engine acceleration value by a vehicle speed limit value, engine speed limit value, transmission speed limit value, and traction control value to generate a second desired engine acceleration value; and controlling said engine output as a function of said second desired engine acceleration value and an actual engine acceleration value.

14. The method of claim 13 wherein the step of limiting said first desired engine acceleration value comprises the step of selecting the lesser of said traction control value and said vehicle speed limit value.

15. The method of claim 13 further comprising the steps of:

converting a speed control system vehicle speed value to said speed control system engine acceleration value;

converting a traction control system vehicle speed value to said traction control value representative of a maximum engine acceleration value to prevent wheel slip; and converting a speed limiting value to said vehicle speed limit value representative of a maximum engine acceleration value to achieve a predetermined vehicle speed limit.

16. The method of claim 13 further comprising the steps of:

generating a desired engine idle acceleration value; and setting said driver demanded engine acceleration value to the greater of said desired engine idle acceleration value and said driver demanded engine acceleration value.

17. An engine output control method for a vehicle having a drive by wire engine system responsive to a desired engine acceleration signal, the method comprising the steps of:

generating a driver demanded vehicle acceleration value corresponding to an operator input;

generating a speed control system vehicle acceleration value corresponding to a predetermined speed value to permit vehicle operation at a constant speed by a speed control system;

generating a vehicle speed limit acceleration value corresponding to a maximum vehicle acceleration value to achieve a predetermined vehicle speed limit;

generating a traction control vehicle acceleration value corresponding to a maximum vehicle acceleration value to prevent wheel slip;

arbitrating between said driver demanded vehicle acceleration value, said speed control system vehicle acceleration value, vehicle speed limit acceleration value, and traction control vehicle acceleration value to derive a first desired vehicle acceleration value;

limiting said first desired vehicle acceleration value by an engine speed limit value and transmission speed limit value to generate a second desired vehicle acceleration value;

converting said second desired vehicle acceleration value to a desired engine acceleration value;

controlling said engine output as a function of said desired engine acceleration value and an actual engine acceleration value.

18. The method of claim 17 further comprising the steps of:

generating a desired engine idle acceleration value; and setting said first desired vehicle acceleration value to the greater of said desired engine idle acceleration value and said first desired vehicle acceleration value.

* * * * *